United States Patent
Zhang et al.

(10) Patent No.: US 10,427,656 B2
(45) Date of Patent: Oct. 1, 2019

(54) BRAKING SYSTEM

(71) Applicant: Ford Global Technologies, LLC, Dearborn, MI (US)

(72) Inventors: Chen Zhang, Canton, MI (US); Li Xu, Northville, MI (US); Yanan Zhao, Ann Arbor, MI (US); George Edmund Walley, III, Novi, MI (US); Mark Davison, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 92 days.

(21) Appl. No.: 15/618,454

(22) Filed: Jun. 9, 2017

(65) Prior Publication Data

US 2018/0354474 A1 Dec. 13, 2018

(51) Int. Cl.
*B60T 7/12* (2006.01)
*B60T 8/172* (2006.01)
*B60T 8/72* (2006.01)

(52) U.S. Cl.
CPC ............... *B60T 7/12* (2013.01); *B60T 7/122* (2013.01); *B60T 8/172* (2013.01); *B60T 8/72* (2013.01); *B60T 2201/02* (2013.01); *B60T 2230/04* (2013.01)

(58) Field of Classification Search
CPC ...................................................... B60T 7/12
See application file for complete search history.

(56) References Cited

U.S. PATENT DOCUMENTS

| | | | | |
|---|---|---|---|---|
| 4,852,950 | A * | 8/1989 | Murakami | B60T 8/17616 303/192 |
| 7,475,953 | B2 * | 1/2009 | Osborn | B60T 7/22 303/125 |
| 9,139,171 | B2 | 9/2015 | Knechtges | |
| 9,248,811 | B2 * | 2/2016 | Kato | B60T 7/22 |
| 9,321,440 | B2 * | 4/2016 | Perlick | B60T 8/1708 |
| 9,499,140 | B2 * | 11/2016 | Fletcher | B60T 7/22 |
| 2001/0024062 | A1 * | 9/2001 | Yoshino | B60K 6/48 303/152 |
| 2010/0174473 | A1 * | 7/2010 | Pursifull | F02D 41/042 701/112 |

(Continued)

FOREIGN PATENT DOCUMENTS

| DE | 4401082 A1 | 7/1995 |
|---|---|---|
| DE | 10131323 A1 | 5/2001 |

(Continued)

OTHER PUBLICATIONS

Search Report from the United Kingdom Intellectual Property Office dated Nov. 19, 2018 regarding Application No. GB1809407.8 (3 pages).

*Primary Examiner* — Alex C Dunn
(74) *Attorney, Agent, or Firm* — Frank MacKenzie; Bejin Bieneman PLC

(57) ABSTRACT

A computer is programmed to determine a target brake torque that is below a preset holding brake torque and at least high enough to hold a vehicle at standstill; and upon detecting that a brake of the vehicle is applied and a speed of the vehicle is below a threshold, monotonically reduce a brake torque of the brake so that the brake torque reaches the target brake torque when the speed reaches substantially zero.

20 Claims, 5 Drawing Sheets

(56) References Cited

U.S. PATENT DOCUMENTS

| | | | |
|---|---|---|---|
| 2013/0060433 A1* | 3/2013 | Maruyama | B60T 7/122 |
| | | | 701/53 |
| 2013/0124058 A1* | 5/2013 | Perlick | B60T 8/1708 |
| | | | 701/70 |
| 2015/0025780 A1* | 1/2015 | Gibson | F02D 43/00 |
| | | | 701/105 |
| 2015/0224976 A1* | 8/2015 | Wang | B60W 10/08 |
| | | | 701/22 |
| 2016/0288786 A1* | 10/2016 | Lavoie | B60T 8/1708 |
| 2018/0015913 A1 | 1/2018 | Das et al. | |
| 2018/0134292 A1 | 5/2018 | Alpman et al. | |

FOREIGN PATENT DOCUMENTS

| | | |
|---|---|---|
| GB | 2529627 A | 3/2016 |
| WO | WO 2004081691 A2 | 9/2004 |

\* cited by examiner

BRAKING SYSTEM

BACKGROUND

Vehicles are equipped with brakes for slowing or stopping the vehicles. One type of brake is a friction brake. Friction brakes provide stopping power through friction between a component rotating with a wheel and a component stationary relative to the vehicle, e.g., disc brakes, drum brakes, band brakes. Another type of brake is a regenerative brake. Regenerative brakes transform the kinetic energy of the vehicle into energy stored in the batteries. Regenerative brakes are an electric motor that may be the same electric motor as in a hybrid-electric powertrain, or an additional electric motor coupled to the wheels. Regenerative brakes operate as generators, into which the forward rotational motion of the wheels provides an input. By reversing the direction of the torque on, for example, the electric motor to resist the motion of the wheels, the electric motor functions as an electrical generator instead of as a motor, and the electric motor absorbs the kinetic energy of the vehicle through the torque and motion of the wheels.

When the brakes of a vehicle are applied to bring the vehicle from moving to a standstill, an acceleration of the vehicle transitions from negative to zero. The transition of the acceleration from negative to zero can cause a "jerk," which is defined as the derivative of acceleration, to oscillate with relatively high amplitude. An occupant of the vehicle feels this jerk as a brief thrust forward and back at the moment the vehicle comes to a complete stop. This may be unexpected, unnerving, and/or unpleasant for the occupant. Not only is jerk a problem in autonomous vehicles, for which the occupant does not request the braking, but in nonautonomous vehicles, e.g., where conventionally a human controls braking by activating a brake pedal, it is a problem that brakes cannot be controlled so that torque is applied to prevent or reduce jerk.

DETAILED DESCRIPTION

Figure 1:
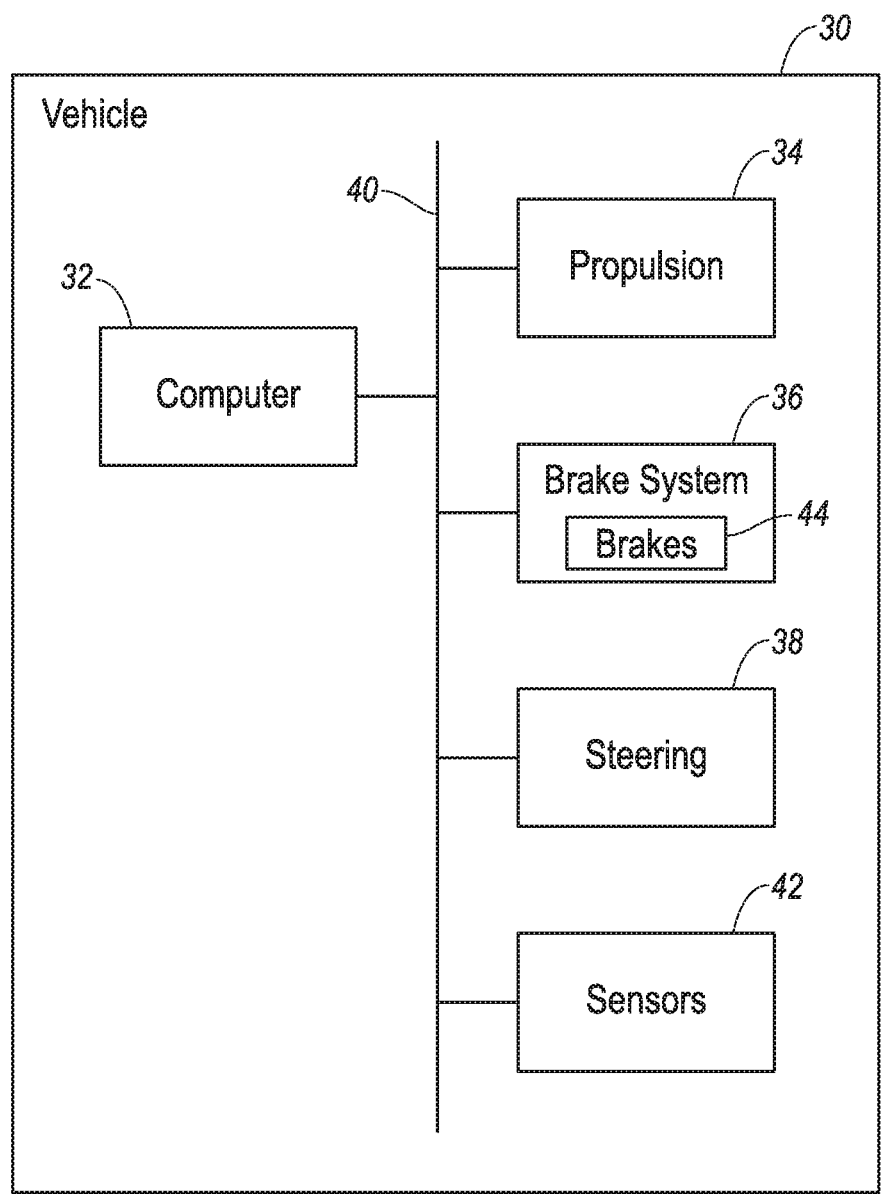
FIG. 1 is a block diagram of an example vehicle.

As disclosed herein it is possible to reduce an amplitude of the jerk experienced by an occupant of a vehicle when the vehicle comes to a stop. A brake torque applied by brakes of the vehicle is controlled by a computer. The computer reduces the brake torque shortly before the vehicle comes to a complete stop. The computer determines a brake schedule, i.e., amounts of torque applied over time during a braking operation, and instructs the brakes (i.e., an electronic brake control unit) to reduce the brake torque according to the determined brake schedule in a fine-grained manner that a human driver pushing a brake pedal could not replicate. The system increases the comfort of occupants of the vehicle.

A computer is programmed to determine a target brake torque that is below a preset holding brake torque and at least high enough to hold a vehicle at standstill; and upon detecting that a brake of the vehicle is applied and a speed of the vehicle is below a threshold, monotonically reduce a brake torque of the brake so that the brake torque reaches the target brake torque when the speed reaches substantially zero.

The computer may be further programmed to, after the brake torque reaches the target brake torque, increase the brake torque to the holding brake torque.

The computer may be further programmed to determine a schedule of brake torques corresponding to a plurality of speeds between the threshold and zero to achieve the monotonic reduction of the brake torque to the target brake torque.

The computer may be further programmed to determine a maximum increase of stopping distance resulting from the monotonic reduction of the brake torque; and to determine the target brake torque so that the vehicle stops within the maximum increase of stopping distance. Determining the target brake torque may be based on the threshold and an initial brake torque when the speed is at the threshold.

The target brake torque may be a minimum brake torque to hold the vehicle at standstill. The computer may be further programmed to determine a maximum increase of stopping distance resulting from the monotonic reduction of the brake torque; and to determine the threshold so that the vehicle stops within the maximum increase of stopping distance. Determining the threshold may be based on the target brake torque and an initial brake torque when the speed is at the threshold.

The computer may be further programmed to determine a modified stopping distance equal to a difference between a default stopping distance and an increase in stopping distance resulting from the monotonic reduction of brake torque; and to apply a brake torque of the brake before the speed reaches the threshold based on the modified stopping distance. The default stopping distance may be based on the threshold and an initial brake torque when the speed is at the threshold.

A method includes determining a target brake torque that is below a preset holding brake torque and at least high enough to hold a vehicle at standstill; and upon detecting that a brake of the vehicle is applied and a speed of the vehicle is below a threshold, monotonically reducing a brake torque of the brake so that the brake torque reaches the target brake torque when the speed reaches substantially zero.

The method may include, after the brake torque reaches the target brake torque, increasing the brake torque to the holding brake torque.

The method may include determining a schedule of brake torques corresponding to a plurality of speeds between the threshold and zero to achieve the monotonic reduction of the brake torque to the target brake torque.

The method may include determining a maximum increase of stopping distance resulting from the monotonic reduction of the brake torque; and determining the target brake torque so that the vehicle stops within the maximum increase of stopping distance. Determining the target brake torque may be based on the threshold and an initial brake torque when the speed is at the threshold.

The target brake torque may be a minimum brake torque to hold the vehicle at standstill. The method may include determining a maximum increase of stopping distance resulting from the monotonic reduction of the brake torque; and determining the threshold so that the vehicle stops within the maximum increase of stopping distance. Determining the threshold may be based on the target brake torque and an initial brake torque when the speed is at the threshold.

The method may include determining a modified stopping distance equal to a difference between a default stopping distance and an increase in stopping distance resulting from the monotonic reduction of brake torque; and applying a brake torque of the brake before the speed reaches the threshold based on the modified stopping distance. The default stopping distance may be based on the threshold and an initial brake torque when the speed is at the threshold.

With reference to FIG. 1, a vehicle 30 may be an autonomous vehicle. For purposes of this disclosure, autonomous operation is defined as driving for which each of a propulsion 34, a brake system 36, and a steering 38 of the vehicle 30 are controlled by a computer 32; semi-autonomous operation is defined as driving for which the computer 32 controls one or two of the propulsion 34, brake system 36, and steering 38.

The computer 32 includes a processor, memory, etc. The memory stores instructions executable by the processor as well as for electronically storing data and/or databases. The computer 32 may be a single computer, as shown in FIG. 1, or may be multiple computers.

The computer 32 may transmit signals through a communications network 40 such as a controller area network (CAN) bus, Ethernet, WiFi, Local Interconnect Network (LIN), onboard diagnostics connector (OBD-II), and/or by any other wired or wireless communications network. The computer 32 may be in communication with the propulsion 34, the brake system 36, the steering 38, and sensors 42.

The propulsion 34 of the vehicle 30 generates energy and translates the energy into motion of the vehicle 30. The propulsion 34 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 34 can include an electronic control unit (ECU) or the like that is in communication with and receives input from the computer 32 and/or a human driver. The human driver may control the propulsion 34 via, e.g., an accelerator pedal and/or a gear-shift lever.

The brake system 36 is typically a known vehicle braking subsystem and resists the motion of the vehicle 30 to thereby slow and/or stop the vehicle 30. The brake system 36 includes brakes 44, which may be friction brakes; regenerative brakes; any other suitable type of brakes; or a combination. Friction brakes provide stopping power through friction between a component rotating with a wheel and a component stationary relative to the vehicle 30, e.g., disc brakes, drum brakes, band brakes, or any other suitable type of friction-inducing brake. Regenerative brakes transform the kinetic energy of the vehicle 30 into energy stored in the batteries. Regenerative brakes are an electric motor that may be the same electric motor as in the hybrid-electric powertrain, or an additional electric motor coupled to the wheels. Regenerative brakes operate as generators, into which the forward rotational motion of the wheels provides an input. By reversing the direction of the torque on, for example, the electric motor to resist the motion of the wheels, the electric motor functions as an electrical generator instead of as a motor, and the electric motor absorbs the kinetic energy of the vehicle 30 through the torque and motion of the wheels. The brake system 36 can include a brake controller, i.e., an electronic control unit (ECU) or the like that is in communication with and receives input from the computer 32 and/or a human driver. The human driver may control the brake system 36 via, e.g., a brake pedal.

The steering 38 is typically a known vehicle steering subsystem and controls the turning of wheels of the vehicle 30. The steering 38 may be a rack-and-pinion system with electric power-assisted steering, a steer-by-wire system, as both are known, or any other suitable system. The steering 38 can include an electronic control unit (ECU) or the like that is in communication with and receives input from the computer 32 and/or a human driver. The human driver may control the steering 38 via, e.g., a steering wheel.

With continued reference to FIG. 1, the vehicle 30 may include the sensors 42. The sensors 42 may provide data about operation of the vehicle 30 via the communications network 40, for example, wheel speed, wheel orientation, and engine and transmission data (e.g., temperature, fuel consumption, etc.). The sensors 42 may detect the position or orientation of the vehicle 30. For example, the sensors 42 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 42 may detect the external world. For example, the sensors 42 may include radar sensors, scanning laser range finders, light detection and ranging (LIDAR) devices, and image processing sensors such as cameras. The sensors 42 may include communications devices, for example, vehicle-to-infrastructure (V2I) or vehicle-to-vehicle (V2V) devices.

Figure 2:
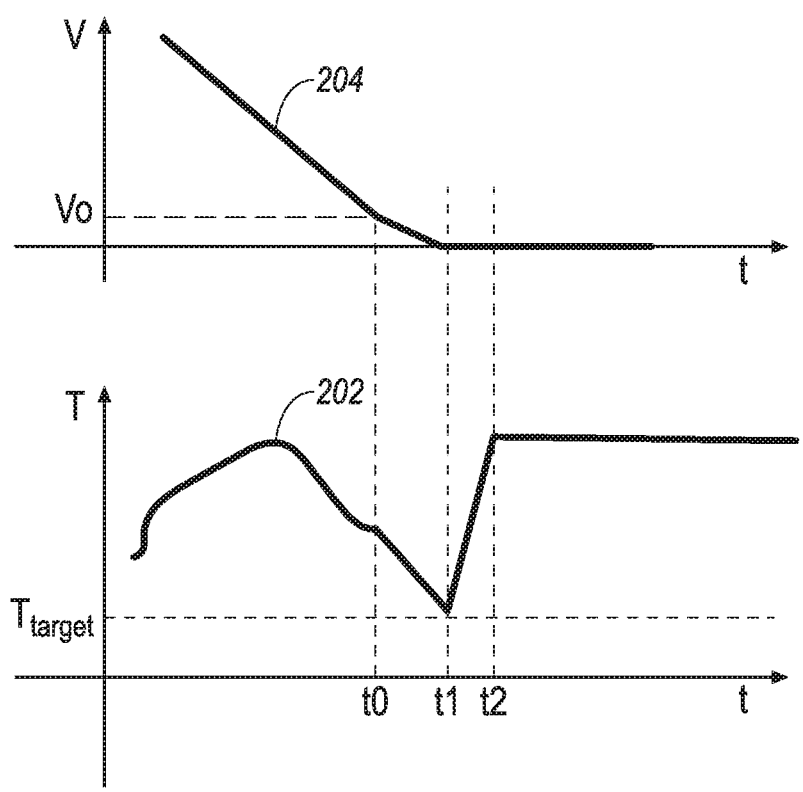
FIG. 2 is an example plot of vehicle speed and brake torque versus time.

With reference to FIG. 2, a brake-torque curve 202 illustrates an example of how the brakes 44 apply a brake torque T versus time t, and a speed curve 204 illustrates the effect on a speed v of the vehicle 30. The computer 32 is programmed to detect that the brakes 44 are applied and that the speed v of the vehicle 30 is below a threshold $v_0$, and, upon so detecting, monotonically reduce the brake torque T of the brakes 44 so that the brake torque T reaches a target brake torque $T_{target}$ when the speed v reaches substantially zero, as shown between a time to and a time $t_1$. As a consequence, an occupant of the vehicle 30 may experience reduced jerk. "Brake torque" is a twisting force applied by the brakes 44 tending to counteract the rotation of wheels of the vehicle 30. How the brakes 44 apply the brake torque T depends on the type of brakes 44; for example, for friction brakes, the computer 32 may choose a brake pressure that will produce a brake torque T. The target brake torque $T_{target}$ is a value of the brake torque T that is less than a holding brake torque $T_{hold}$ and greater than or equal to a minimum brake torque $T_{min}$. The holding brake torque $T_{hold}$ is a preset value of the brake torque T for holding the vehicle 30 stationary when the vehicle 30 is not in park. The holding brake torque $T_{hold}$ may be determined by applying a safety factor to a brake torque T that holds the vehicle 30 stationary in experiments and/or simulations. The minimum brake torque $T_{min}$ is a lowest value of the brake torque T that will hold the vehicle 30 at standstill when the vehicle 30 is not in park. The minimum brake torque $T_{min}$ may be determined by experiments and/or simulations. Alternatively, the minimum brake torque $T_{min}$ may be calculated based on a temperature of the brakes 44, an angle of a slope on which the vehicle 30 is stopped, etc., and the relationship between the minimum brake torque $T_{min}$ and the temperature of the brakes 44, the angle of a slope on which the vehicle 30 is stopped, etc. may be determined by experiments and/or simulations. Monotonic reduction from a first value of a quantity to a second value of the quantity occurs when the quantity decreases from the first value without increasing until the quantity reaches the second value.

To achieve the monotonic reduction of the brake torque T to the target brake torque $T_{target}$, the computer 32 may be programmed to determine a schedule of brake torques $T_1$, $T_2$, etc. corresponding to a plurality of speeds $v_1$, $v_2$, etc. between the threshold $v_0$ and zero. The schedule may be stored by the computer 32 as a table. The schedule may be in the speed domain, that is, the brake torques $T_1$, $T_2$, etc. are paired with speeds $v_1$, $v_2$, etc. rather than with, e.g., times $t_1$, $t_2$, etc. When the vehicle 30 reaches a speed $v_n$, the computer 32 instructs the brakes 44 to apply the brake torque $T_r$, corresponding to the speed $v_n$ on the schedule.

With continued reference to FIG. 2, at the time $t_1$, the brake torque T reaches the target brake torque $T_{target}$ substantially simultaneously to the speed v of the vehicle 30 reaching zero. The computer 32 may be programmed to, after the brake torque T reaches the target brake torque $T_{target}$, increase the brake torque T to the holding brake torque $T_{hold}$, as shown between the time $t_1$ and a time $t_2$.

Figure 3:
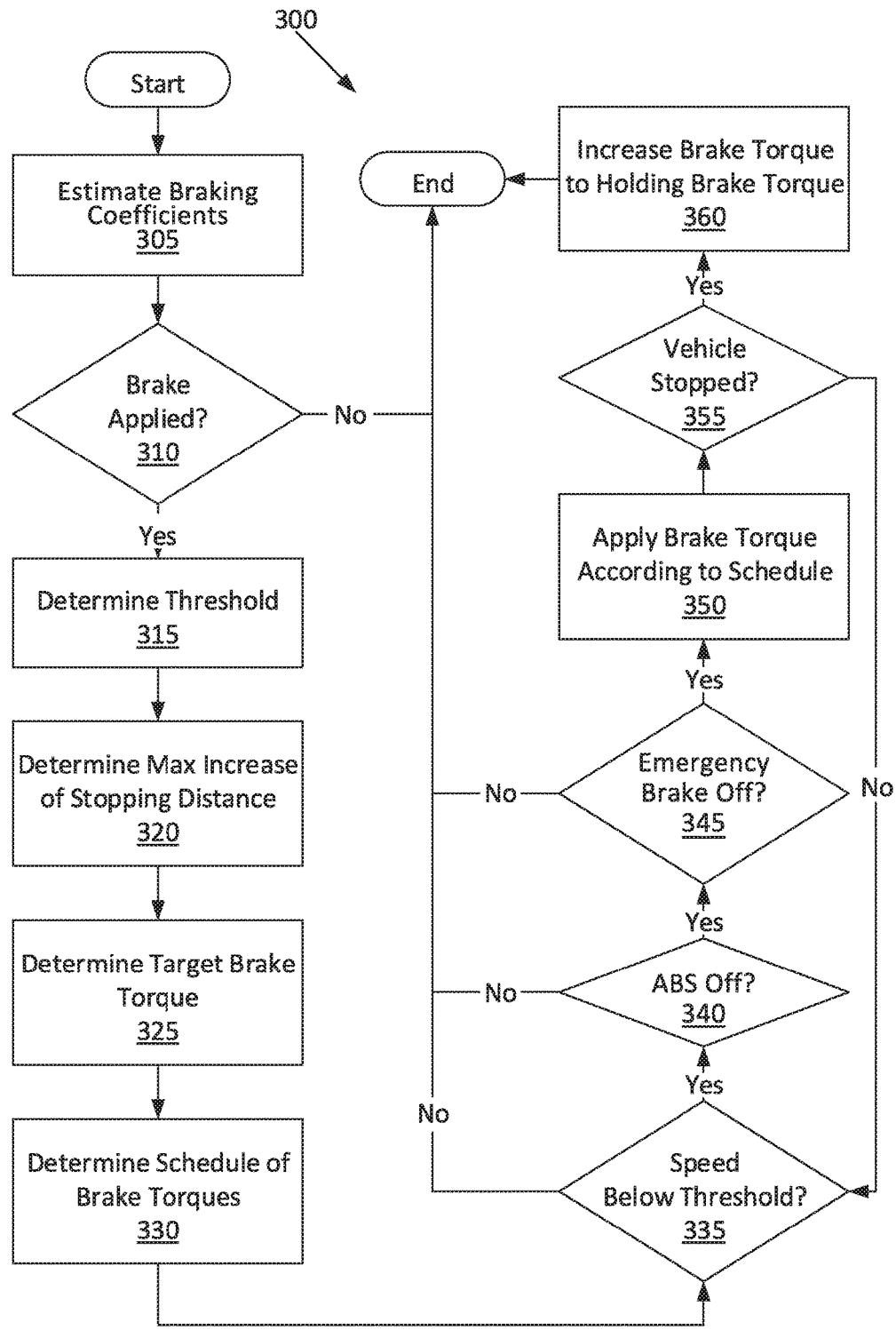
FIG. 3 is a process flow diagram of an exemplary process for applying brake torque.

FIG. 3 is a process flow diagram illustrating an exemplary process 300 for applying brake torque. The memory of the computer 32 may store programming for performing the steps of the process 300.

The process 300 begins in a block 305, in which the computer 32 determines braking coefficients. The braking coefficients $a_0$, $b_0$ are values characteristic of the brake system 36 that are used in equations below. The braking coefficients $a_0$, $b_0$ may be predetermined for the brake system 36 and stored in memory. Alternatively, the braking coefficients $a_0$, $b_0$ may vary based on, e.g., the temperature of the brake system 36, and the computer 32 may calculate the braking coefficients $a_0$, $b_0$ with a formula whereby the braking coefficients $a_0$, $b_0$ are a function of, e.g., the temperature of the brake system 36.

Next, in a decision block 310, the computer 32 determines whether the brakes 44 of the vehicle 30 are applied. The brakes 44 may be applied by a human driver pushing on the brake pedal or by the computer 32 deciding to apply the brakes 44 based on autonomous-driving algorithms, as are known. If the brakes 44 are not applied, the process 300 ends.

If the brakes 44 are applied, next, in a block 315, the computer 32 determines the threshold $v_0$. The threshold $v_0$ may be predetermined and stored in the memory of the computer 32. The threshold $v_0$ may be chosen by using experiments and/or simulations to measure the effect of braking at various speeds on the jerk.

Next, in a block 320, the computer 32 determines a maximum increase $\Delta s_{max}$ of stopping distance resulting from the monotonic reduction of the brake torque T, i.e., a maximum distance that the stopping distance can be increased where reduction of the brake torque T is monotonic. Further, the maximum increase $\Delta s_{max}$ of stopping distance is an additional distance estimated to be safe, e.g., according to factors discussed below, above a default stopping distance $s_{brk}$. The default stopping distance $s_{brk}$ may be determined by assuming constant deceleration according to the formula:

$$s_{brk} = \frac{-v_0^2}{2*(a_0 T_0 + b_0)}$$

in which $T_0$ is an initial brake torque when the speed v is at the threshold $v_0$. Other assumptions than constant deceleration may produce different formulas. The maximum increase $\Delta s_{max}$ of stopping distance may be determined from, e.g., following distance, i.e., a distance between the vehicle 30 and a vehicle traveling in front of the vehicle 30; speed v; see-ahead distance, i.e., a maximum distance in a direction of travel of the vehicle 30 that the sensors 42 can detect obstacles; the default stopping distance $s_{brk}$, etc. The see-ahead distance may be negatively affected by, e.g., fog, other vehicles, hills, buildings, and other obstacles and terrain over and around which the vehicle 30 is traveling. For example, the maximum increase $\Delta s_{max}$ of stopping distance may be determined according to the formula:

$$\Delta s_{max} = -s_{clear} - s_{brk}$$

in which $s_{clear}$ is the minimum of the following distance, the see-ahead distance, and a distance to a nearest obstacle in the direction of travel.

Next, in a block 325, the computer 32 determines the target brake torque $T_{target}$. The target brake torque $T_{target}$ is less than the holding brake torque $T_{hold}$ and greater than or equal to the minimum brake torque $T_{min}$ to hold the vehicle 30 at standstill. The computer 32 determines the target brake torque $T_{target}$ so that the vehicle 30 stops within a distance that is the maximum increase $\Delta s_{max}$ of stopping distance. The computer 32 determines the target brake torque $T_{target}$ based on the threshold $v_0$, the initial brake torque $T_0$, and the maximum increase $\Delta s_{max}$ of stopping distance, as well as the braking coefficients $a_0$, $b_0$. The computer 32 may determine the target brake torque $T_{target}$ by solving this formula:

$$\Delta s_{max} = \frac{-v_0^2}{\left(\frac{a_0(T_{target} + T_0)}{2} + b_0\right)^2}\left[\left(\frac{1}{3}T_{target} + \frac{1}{6}T_0\right)a_0 + \frac{1}{2}b_0\right] + \frac{v_0^2}{2*(a_0 T_0 + b_0)}$$

This formula represents a difference between the default stopping distance $s_{brk}$ and a modified stopping distance $s'_{brk}$, and sets the difference equal to the maximum increase $\Delta s_{max}$ of stopping distance. The formula assumes constant deceleration for the default stopping distance $s_{brk}$ and linearly decreasing brake torque T for the modified stopping distance $s'_{brk}$. Other patterns of brake torque T besides constant deceleration may be used for the default stopping distance $s_{brk}$. Other patterns of brake torque T besides linear decay may be used for the modified stopping distance $s'_{brk}$ that are still monotonically decreasing.

Next, in a block 330, the computer 32 determines a schedule of brake torques $T_1$, $T_2$, etc. corresponding to a plurality of speeds $v_1$, $v_2$, etc. between the threshold $v_0$ and zero to achieve the monotonic reduction of the brake torque T from the initial brake torque $T_0$ to the target brake torque $T_{target}$. The schedule of brake torques $T_1$, $T_2$, etc. may be linearly decaying or may use a different pattern that is monotonically decreasing. The schedule may be stored by the computer 32 as a table or the like. The schedule may be in the speed domain, that is, the brake torques $T_1$, $T_2$, etc. are paired with speeds $v_1$, $v_2$, etc. rather than with, e.g., times $t_1$, $t_2$, etc.

Next, in a decision block 335, the computer 32 determines whether the speed v of the vehicle 30 is below the threshold $v_0$. If the speed v is above the threshold $v_0$, the process 300 ends.

If the speed v of the vehicle 30 is below the threshold $v_0$, next, in a decision block 340, the computer 32 determines whether an anti-lock brake system (not shown) is engaged. If the anti-lock brake system is engaged, the process 300 ends.

If the anti-lock brake system is off, next, in a decision block 345, the computer 32 determines whether an emergency brake (not shown) is engaged. The emergency brake is an auxiliary brake separate from the brake system 36 and may be controlled by, e.g., a lever in the vehicle 30. The emergency brake may also be referred to as a parking brake or as a handbrake. If the emergency brake is engaged, the process 300 ends.

If the emergency brake is off, next, in a block 350, the computer 32 instructs the brakes 44 to apply the brake torque T according to the schedule, i.e., monotonically reduces the brake torque T of the brakes 44 so that the brake torque T reaches the target brake torque $T_{target}$ when the speed v reaches substantially zero.

Next, in a decision block 355, the computer 32 determines whether the brake torque T has reached the target brake torque $T_{target}$, i.e., whether the vehicle 30 has stopped. If the vehicle 30 has not stopped, the process 300 returns to the decision block 335; in other words, as long as the speed v is below the threshold $v_0$, the anti-lock brake is off, and the emergency brake is off, the computer 32 continues to apply the brake torque T according to the schedule.

If the vehicle 30 has stopped, i.e., after the brake torque T reaches the target brake torque $T_{target}$, next, in a block 360, the computer 32 increases the brake torque T to the holding brake torque $T_{hold}$. After the block 360, the process 300 ends.

Figure 4:
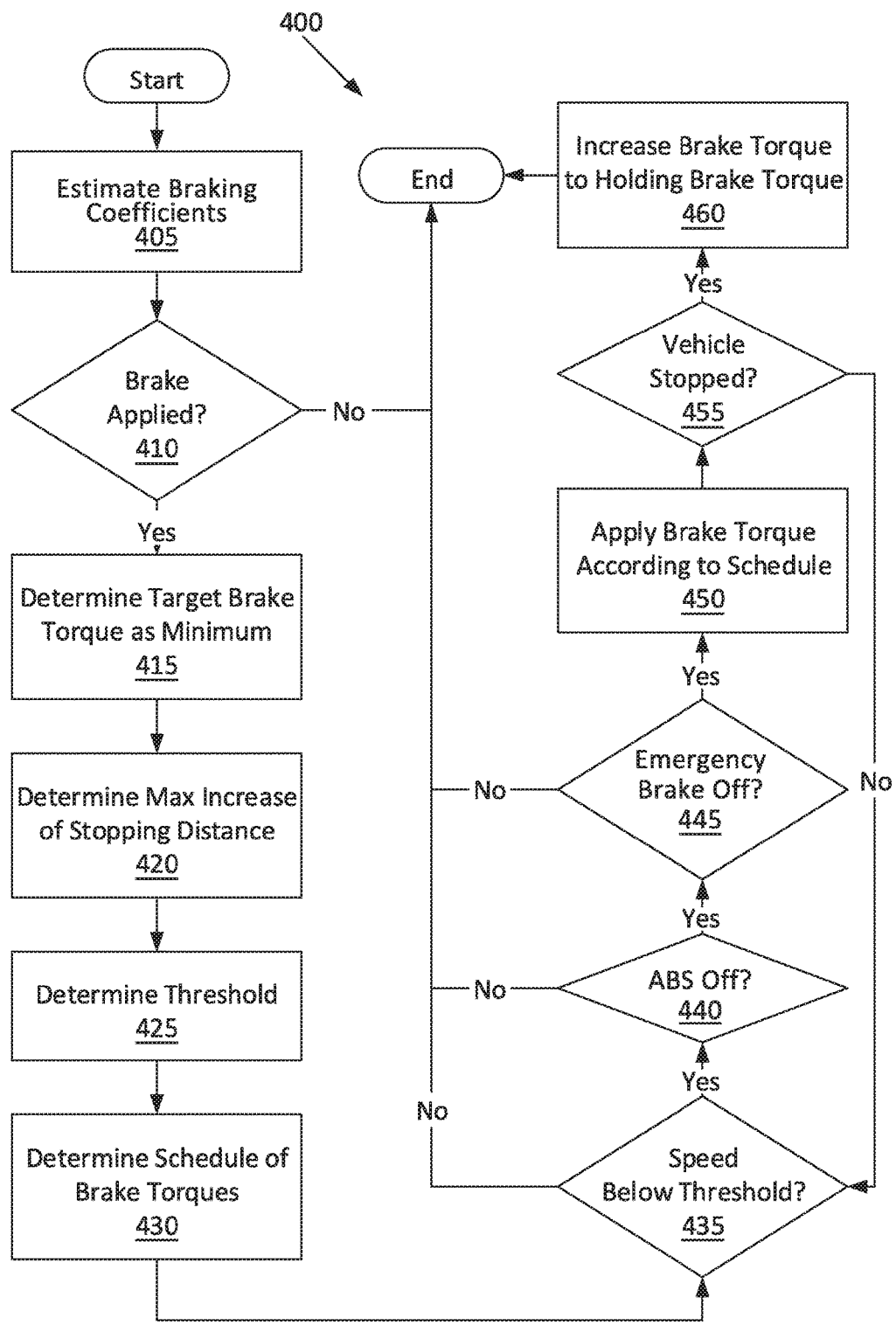
FIG. 4 is a process flow diagram of a second exemplary process for applying brake torque.

FIG. 4 is a process flow diagram illustrating an exemplary process 400 for applying brake torque. The memory of the computer 32 may store programming for performing the steps of the process 400.

The process 400 begins in a block 405, in which the computer 32 estimates the braking coefficients $a_0$, $b_0$, as described above with respect to the block 305 of the process 300.

Next, in a decision block 410, the computer 32 determines whether the brakes 44 of the vehicle 30 are applied, as described above with respect to the decision block 310 of the process 300. If the brakes 44 are not applied, the process 400 ends.

If the brakes 44 are applied, next, in a block 415, the computer 32 determines the target brake torque $T_{target}$. The target brake torque $T_{target}$ is set to equal the minimum brake torque $T_{min}$, i.e., a lowest value of the brake torque T that will hold the vehicle 30 at standstill when the vehicle 30 is not in park.

Next, in a block 420, the computer 32 determines a maximum increase $\Delta s_{max}$ of stopping distance resulting from the monotonic reduction of the brake torque T, as described above with respect to the block 320 of the process 300.

Next, in a block 425, the computer 32 determines the threshold $v_0$ so that the vehicle 30 stops within the maximum increase $\Delta s_{max}$ of stopping distance. The computer 32 determines the threshold $v_0$ based on the target brake torque $T_{target}$, the initial brake torque $T_0$, and the maximum increase $\Delta s_{max}$ of stopping distance, as well as the braking coefficients $a_0$, $b_0$. The computer 32 may determine the threshold $v_0$ by solving this formula:

$$\Delta s_{max} = \frac{-v_0^2}{\left(\frac{a_0(T_{target}+T_0)}{2}+b_0\right)^2}\left[\left(\frac{1}{3}T_{target}+\frac{1}{6}T_0\right)a_0+\frac{1}{2}b_0\right] + \frac{v_0^2}{2*(a_0T_0+b_0)}$$

This formula represents a difference between the default stopping distance $s_{brk}$ and the modified stopping distance $s'_{brk}$. The formula assumes constant deceleration for the default stopping distance $s_{brk}$ and linearly decreasing brake torque T for the modified stopping distance $s'_{brk}$. Other patterns of brake torque T besides constant deceleration may be used for the default stopping distance $s_{brk}$. Other patterns of brake torque T besides linear decay may be used for the modified stopping distance $s_{brk}$ that are still monotonically decreasing.

Next, in a block 430, the computer 32 determines a schedule of brake torques $T_1$, $T_2$, etc., corresponding to a plurality of speeds $v_1$, $v_2$, etc. between the threshold $v_0$ and zero to achieve the monotonic reduction of the brake torque T from the initial brake torque $T_0$ to the target brake torque $T_{target}$, as described above with respect to the block 330 of the process 300.

Next, in a decision block 435, the computer 32 determines whether the speed v of the vehicle 30 is below the threshold $v_0$. If the speed v is above the threshold $v_0$, the process 400 ends.

If the speed v of the vehicle 30 is below the threshold $v_0$, next, in a decision block 440, the computer 32 determines whether the anti-lock brake system is engaged. If the anti-lock brake system is engaged, the process 400 ends.

If the anti-lock brake system is off, next, in a decision block 445, the computer 32 determines whether an emergency brake is engaged. If the emergency brake is engaged, the process 400 ends.

If the emergency brake is off, next, in a block 450, the computer 32 instructs the brakes 44 to apply the brake torque T according to the schedule, i.e., monotonically reduces the brake torque T of the brakes 44 so that the brake torque T reaches the target brake torque $T_{target}$ when the speed v reaches substantially zero.

Next, in a decision block 455, the computer 32 determines whether the brake torque T has reached the target brake torque $T_{target}$, i.e., whether the vehicle 30 has stopped. If the vehicle 30 has not stopped, the process 400 returns to the decision block 435; in other words, as long as the speed v is below the threshold $v_0$, the anti-lock brake is off, and the emergency brake is off, the computer 32 continues to apply the brake torque T according to the schedule.

If the vehicle 30 has stopped, i.e., after the brake torque T reaches the target brake torque $T_{target}$, next, in a block 460, the computer 32 increases the brake torque T to the holding brake torque $T_{hold}$. After the block 460, the process 400 ends.

Figure 5:
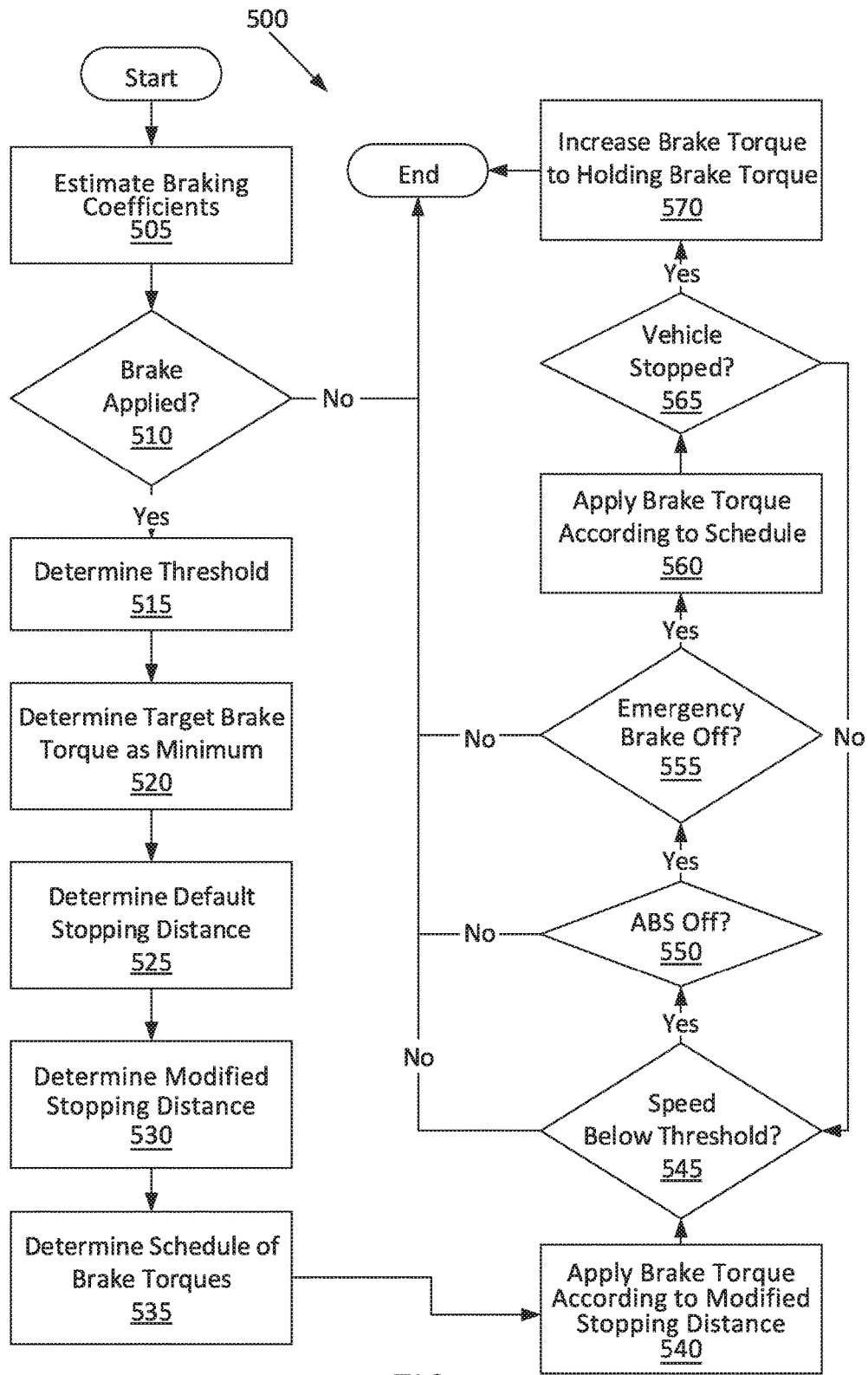
FIG. 5 is a process flow diagram of a third exemplary process for applying brake torque.

FIG. 5 is a process flow diagram illustrating an exemplary process 500 for applying brake torque. The computer 32 may be programmed to perform the steps of the process 500.

The process 500 begins in a block 505, in which the computer 32 estimates the braking coefficients $a_0$, $b_0$, as described above with respect to the block 305 of the process 300.

Next, in a decision block 510, the computer 32 determines whether the brakes 44 of the vehicle 30 are applied, as described above with respect to the decision block 310 of the process 300. If the brakes 44 are not applied, the process 500 ends.

If the brakes 44 are applied, next, in a block 515, the computer 32 determines the threshold $v_0$, as described above with respect to a block 315 of the process 300.

Next, in a block 520, the computer 32 determines the target brake torque $T_{target}$. The target brake torque $T_{target}$ is set to equal the minimum brake torque $T_{min}$, i.e., a lowest value of the brake torque T that will hold the vehicle 30 at standstill when the vehicle 30 is not in park.

Next, in a block 525, the computer 32 determines the default stopping distance $s_{brk}$ based on the threshold $v_0$ and the initial brake torque $T_0$, as well as the braking coefficients $a_0$, $b_0$. The default stopping distance $s_{brk}$ may be determined, e.g., from autonomous-driving algorithms of the computer 32, as are known. Alternatively, the default stopping distance $s_{brk}$ may be determined by assuming constant deceleration according to this formula:

$$s_{brk} = \frac{-v_0^2}{2*(a_0 T_0 + b_0)}$$

Next, the computer 32 determines a modified stopping distance $s'_{brk}$ equal to a difference between the default stopping distance $s_{brk}$ and the maximum increase $\Delta s_{max}$ of stopping distance resulting from the monotonic reduction of brake torque:

$$s'_{brk} = s'_{brk} - \Delta s_{max}$$

The maximum increase $\Delta s_{max}$ of stopping distance may be calculated according to the formula described above with respect to the block 325 of the process 300.

Next, in a block 535, the computer 32 determines a schedule of brake torques $T_1$, $T_2$, etc. corresponding to a plurality of speeds $v_1$, $v_2$, etc. between the threshold $v_0$ and zero to achieve the monotonic reduction of the brake torque T from the initial brake torque $T_0$ to the target brake torque $T_{target}$, as described above with respect to the block 330 of the process 300.

Next, in a block 540, the computer 32 applies a brake torque T before the speed reaches the threshold $v_0$ based on the modified stopping distance $s'_{brk}$. The brake torque T may be determined, e.g., from autonomous-driving algorithms of the computer 32. Alternatively or additionally, the brake torque T may be determined by assuming constant deceleration and solving this formula:

$$s'_{brk} = \frac{-v_{current}^2}{2*(a_0 T + b_0)}$$

in which $v_{current}$ is a current speed of the vehicle 30.

Next, in a decision block 545, the computer 32 determines whether the speed v of the vehicle 30 is below the threshold $v_0$. If the speed v is above the threshold $v_0$, the process 500 ends.

If the speed v of the vehicle 30 is below the threshold $v_0$, next, in a decision block 550, the computer 32 determines whether the anti-lock brake system is engaged. If the anti-lock brake system is engaged, the process 500 ends.

If the anti-lock brake system is off, next, in a decision block 555, the computer 32 determines whether an emergency brake is engaged. If the emergency brake is engaged, the process 500 ends.

If the emergency brake is off, next, in a block 560, the computer 32 instructs the brakes 44 to apply the brake torque T according to the schedule, i.e., monotonically reduces the brake torque T of the brakes 44 so that the brake torque T reaches the target brake torque $T_{target}$ when the speed v reaches substantially zero.

Next, in a decision block 565, the computer 32 determines whether the brake torque T has reached the target brake torque $T_{target}$, i.e., whether the vehicle 30 has stopped. If the vehicle 30 has not stopped, the process 500 returns to the decision block 545; in other words, as long as the speed v is below the threshold $v_0$, the anti-lock brake is off, and the emergency brake is off, the computer 32 continues to apply the brake torque T according to the schedule.

If the vehicle 30 has stopped, i.e., after the brake torque T reaches the target brake torque $T_{target}$, next, in a block 570, the computer 32 increases the brake torque T to the holding brake torque $T_{hold}$. After the block 570, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

What is claimed is:

1. A computer comprising a processor and a memory storing instructions executable by the processor to:
    upon detecting that a brake of a vehicle is applied, determine a target brake torque that is below a preset holding brake torque and at least as great as a minimum brake torque, wherein the minimum brake torque is a lowest value of the brake torque that will hold the vehicle at standstill;
    upon detecting that the brake is applied, determine at least one of a threshold of a speed of the vehicle or a modified stopping distance of the vehicle, wherein determining either the target brake torque or the at least one of the threshold or the modified stopping distance is based on a current clear distance of the vehicle in a direction of travel of the vehicle, wherein the clear distance is a minimum of at least one of a following distance, a see-ahead distance, and a distance to a nearest obstacle; and
    then, upon detecting that the speed of the vehicle is below the threshold, monotonically reduce a brake torque of the brake so that the brake torque reaches the target brake torque when the speed reaches substantially zero at the modified stopping distance.

2. The computer of claim 1, further programmed to, after the brake torque reaches the target brake torque, increase the brake torque to the holding brake torque.

3. The computer of claim 1, further programmed to determine a schedule of brake torques corresponding to a plurality of speeds between the threshold and zero to achieve the monotonic reduction of the brake torque to the target brake torque.

4. The computer of claim 1, further programmed to determine a maximum increase of stopping distance resulting from the monotonic reduction of the brake torque; and to determine the target brake torque so that the vehicle stops within the maximum increase of stopping distance.

5. The computer of claim 4, wherein determining the target brake torque is based on the threshold and an initial brake torque when the speed is at the threshold.

6. The computer of claim 1, wherein the target brake torque is the minimum brake torque.

7. The computer of claim 6, further programmed to determine a maximum increase of stopping distance resulting from the monotonic reduction of the brake torque; and to determine the threshold so that the vehicle stops within the maximum increase of stopping distance.

8. The computer of claim 7, wherein determining the threshold is based on the target brake torque and an initial brake torque when the speed is at the threshold.

9. The computer of claim 6, further programmed to determine the modified stopping distance equal to a difference between a default stopping distance and an increase in stopping distance resulting from the monotonic reduction of brake torque; and to apply a brake torque of the brake before the speed reaches the threshold based on the modified stopping distance.

10. The computer of claim 9, wherein the default stopping distance is based on the threshold and an initial brake torque when the speed is at the threshold.

11. A method comprising:
    upon detecting that a brake of a vehicle is applied, determining a target brake torque that is below a preset holding brake torque and at least as great as a minimum brake torque, wherein the minimum brake torque is a lowest value of the brake torque that will hold a vehicle at standstill;
    upon detecting that the brake is applied, determining at least one of a threshold of a speed of the vehicle or a modified stopping distance of the vehicle, wherein determining either the target brake torque or the at least one of the threshold or the modified stopping distance is based on a current clear distance of the vehicle in a direction of travel of the vehicle, wherein the clear distance is a minimum of at least one of a following distance, a see-ahead distance, and a distance to a nearest obstacle; and
    then, upon detecting that the speed of the vehicle is below the threshold, monotonically reducing a brake torque of the brake so that the brake torque reaches the target brake torque when the speed reaches substantially zero at the modified stopping distance.

12. The method of claim 11, further comprising, after the brake torque reaches the target brake torque, increasing the brake torque to the holding brake torque.

13. The method of claim 11, further comprising determining a schedule of brake torques corresponding to a plurality of speeds between the threshold and zero to achieve the monotonic reduction of the brake torque to the target brake torque.

14. The method of claim 11, further comprising determining a maximum increase of stopping distance resulting from the monotonic reduction of the brake torque; and determining the target brake torque so that the vehicle stops within the maximum increase of stopping distance.

15. The method of claim 14, wherein determining the target brake torque is based on the threshold and an initial brake torque when the speed is at the threshold.

16. The method of claim 11, wherein the target brake torque is the minimum brake torque.

17. The method of claim 16, further comprising determining a maximum increase of stopping distance resulting from the monotonic reduction of the brake torque; and determining the threshold so that the vehicle stops within the maximum increase of stopping distance.

18. The method of claim 17, wherein determining the threshold is based on the target brake torque and an initial brake torque when the speed is at the threshold.

19. The method of claim 16, further comprising determining the modified stopping distance equal to a difference between a default stopping distance and an increase in stopping distance resulting from the monotonic reduction of brake torque; and applying a brake torque of the brake before the speed reaches the threshold based on the modified stopping distance.

20. The method of claim 19, wherein the default stopping distance is based on the threshold and an initial brake torque when the speed is at the threshold.

* * * * *